May 8, 1951  A. PEREZ  2,552,379
AUXILIARY SHOCK ABSORBER FOR VEHICLES
Filed Jan. 13, 1948  5 Sheets-Sheet 1
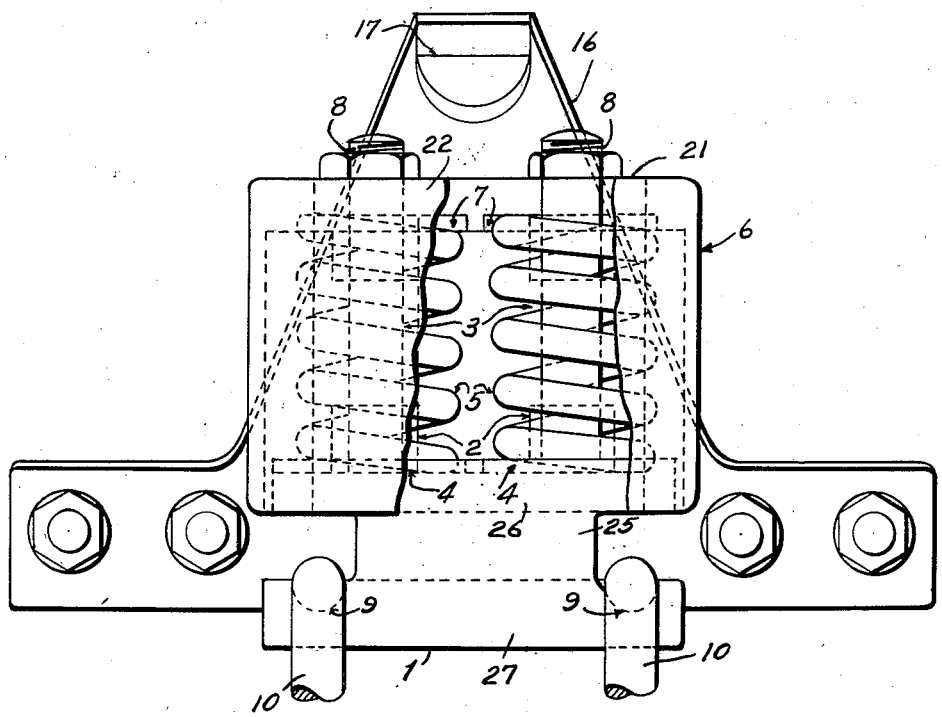
—Fig.-1—
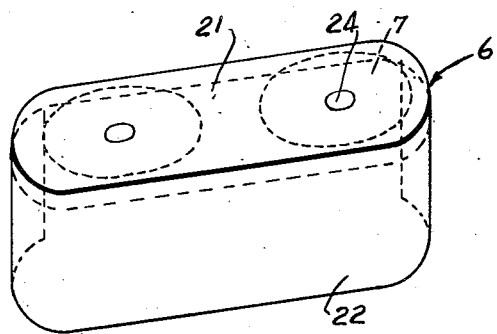
—Fig.-2—
Inventor
Avelino Perez
By Peck & Peck
Attorneys May 8, 1951 A. PEREZ 2,552,379
AUXILIARY SHOCK ABSORBER FOR VEHICLES
Filed Jan. 13, 1948 5 Sheets-Sheet 2

Inventor
Avelino Perez
By Peck & Peck
Attorneys

May 8, 1951 A. PEREZ 2,552,379
AUXILIARY SHOCK ABSORBER FOR VEHICLES
Filed Jan. 13, 1948 5 Sheets-Sheet 3
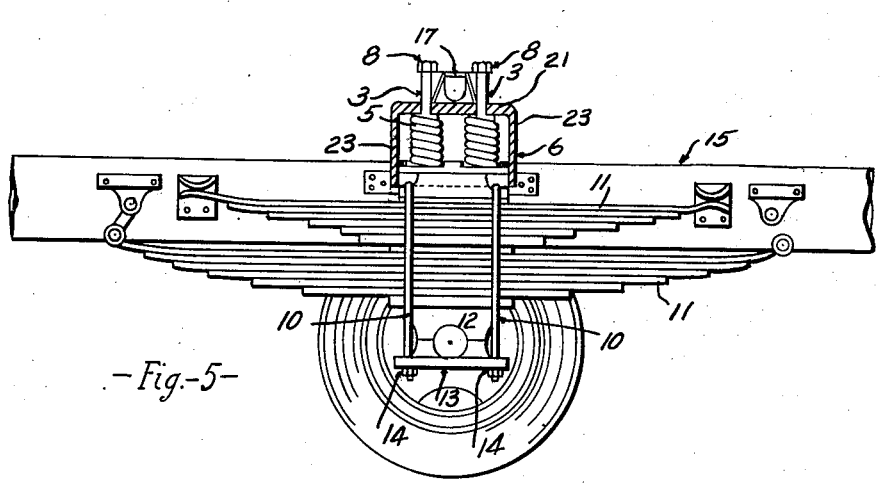
Fig.-5-
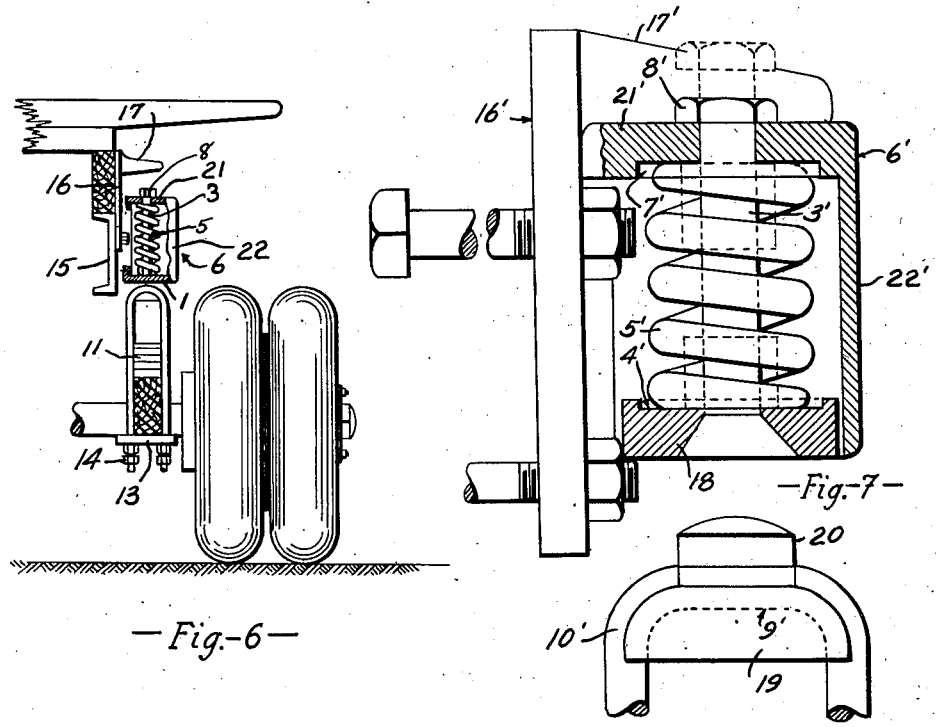
Fig.-6-  Fig.-7-
Inventor
Aurelio Perez
By Peck & Peck
Attorneys May 8, 1951 A. PEREZ 2,552,379
AUXILIARY SHOCK ABSORBER FOR VEHICLES
Filed Jan. 13, 1948 5 Sheets-Sheet 5
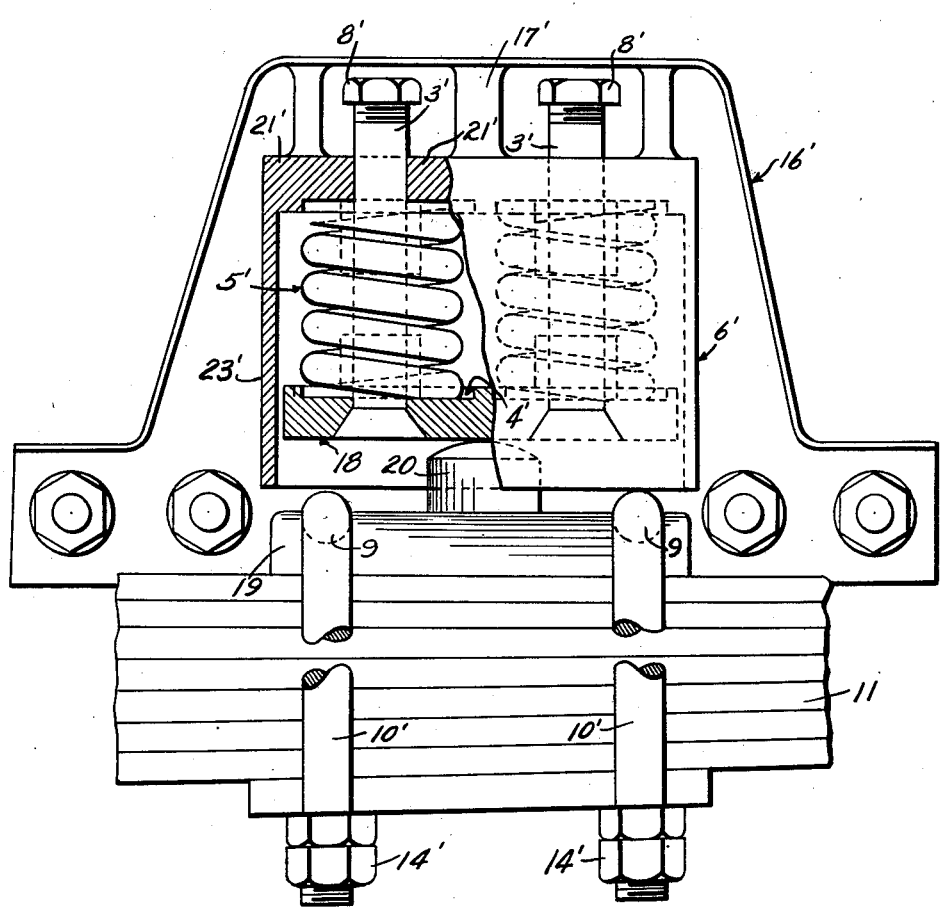
—Fig.-9.—
Inventor
Avelino Perez
By Peck & Peck
Attorneys Patented May 8, 1951

2,552,379

UNITED STATES PATENT OFFICE 2,552,379

AUXILIARY SHOCK ABSORBER FOR VEHICLES

Avelino Perez, Province of Oriente, Cuba

Application January 13, 1948, Serial No. 2,044

1 Claim. (Cl. 267—28)

This invention relates broadly to shock absorbers for various types of vehicles, and in its more specific aspects it relates to shock absorbers which are auxiliary to the usual main spring suspension means for the vehicle whereby greater loads may be safely carried; and the nature and objects of the invention will be readily recognized and understood by those skilled in the arts to which it relates in the light of the following explanation and detailed description of the accompanying drawings illustrating what I at present believe to be the preferred embodiments and mechanical expressions of my invention from among various other forms, arrangements, combinations and constructions, of which the invention is capable within the spirit and scope thereof.

A primary object of my invention is to provide an auxiliary shock absorber for vehicles such as motor trucks which are designed to transport large and heavy loads.

A major problem of motor trucks which have sustaining springs of the leaf and other types results from the constant breakage of the springs due to overloading and/or rough roads over which such trucks travel. I have devised an auxiliary device for installation with vehicles whereby the shock on the usual sustaining springs is avoided and breakage thereof is practically eliminated.

Another object of my invention resides in the provision of a shock absorber for attachment to vehicles having sustaining springs whereby sudden shocks and pressures on the sustaining springs which might cause damage thereto are avoided.

Another object of my invention resides in the provision of an auxiliary shock absorber adaptable with facility to all vehicles possessing sustaining springs.

Another object of my invention resides in a shock absorber for mounting on vehicles possessing sustaining springs, which will result in many economies in the operation of the vehicles and will prolong the life thereof.

Another object of my invention is to provide an auxiliary shock absorber for motor trucks and the like cargo vehicles which will permit the carrying of heavier loads.

Another object of my invention is to provide an auxiliary shock absorber which is relatively inexpensive to produce and which may be installed on vehicles without requiring the use of special equipment or tools.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

Fig. 1 is a view in front elevation of the auxiliary shock absorber with parts thereof broken away.

Fig. 2 is a view in perspective of the operating casing of the auxiliary shock absorber.

Fig. 5 is a view similar to Fig. 4 but showing the assembly when the vehicle is loaded.

Fig. 6 is a view in end elevation in section through the shock absorber installed on a vehicle.

Fig. 7 is a view in end elevation, partly in section, of a modified form of shock absorber.

Fig. 9 is a view similar to Fig. 8 but showing the assembly when the vehicle is loaded.

Figure 3:
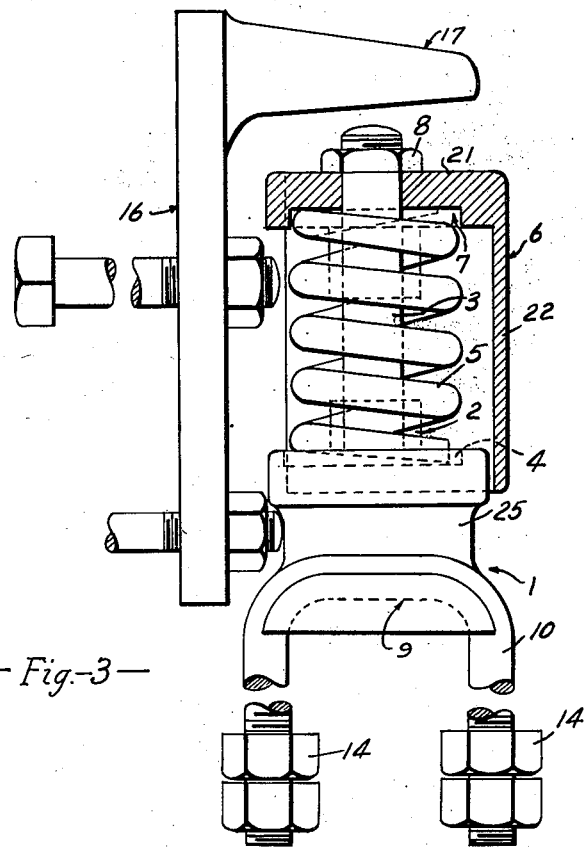
Fig. 3 is a view in end elevation, partly in section, of the auxiliary shock absorber, parts thereof being broken away.

Referring to the accompanying drawings wherein I have used the numeral 1 to designate in its entirety a base member of my auxiliary shock absorber which comprises a block-like, generally I-shaped, solid member, comprising a web 25 and upper and lower plate-like elements 26 and 27 respectively. The upper plate-like element 26 which is generally of rectangular configuration is provided on its upper surface with two spaced sockets or upstanding tubular elements 2 which are internally threaded for threadedly receiving the lower ends of rods or bolts 3. While, in the particular example illustrated in the drawings I have disclosed the sockets 2 for associating the rods 3 to the plate 26, it is within the spirit and scope of my invention to eliminate the sockets 2 and fasten the rods in any suitable manner directly to the plate 26 of the connecting block 1. If the sockets were eliminated it would probably be convenient to construct the plate 26 of the base member 1 integral with the rods. However, in the particular embodiment disclosed in the drawings it will be understood that the rods 3 are separable from the plate 26 of the base member or block. The upper surface of the plate 26 is provided with annular grooves or recesses 4, which extend around the sockets 2 and are of substantially greater diameter than the sockets. Around each rod 3 I dispose coil tension springs 5, the lower ends of which seat within the recesses or grooves 4 on the upper surfaces of the plate 26. Reference to the drawings clearly illustrates that the springs 5 extend about the rods 3 substantially the length thereof.

The auxiliary shock absorber of this invention comprises an operating casing structure which I have designated in its entirety by the numeral 6. The casing or cover 6 includes a top 21, a front wall 22, and end walls 23, it being noted that the top wall 21 is of substantially greater thickness than the end walls and front wall. Thus, the casing 6 includes a top, a front, and end walls, but does not include a rear wall. The casing 6 is adapted to extend over the springs, the upper ends of the rods slidably projecting through apertures or openings 24 which are provided in the top 21 of the casing. Annular recesses or grooves 7 are formed on the under or lower surface of the top 21 of the casing 6, such recesses being complementary to and of substantially the same dimensions as the hereinbefore described recesses 4. Grooves 7 are adapted to receive the uppermost coils of the springs.

When the structure just described is assembled, the rods 3 are screwed into the sockets 2, the springs 5 are then placed about the rods with the lowermost coils thereof seated in the recesses 4. Nuts 8 are then screwed on the bolts 3 exteriorly of the casing. The nuts 8 are screwed on the bolts sufficiently to press the top 21 of the casing against the upper coils of the springs as particularly illustrated in Figs. 1 and 3 of the drawings.

The plate-like member 27 of the base member or block 1 is provided with transverse grooves 9 which are formed adjacent to but removed from each end thereof. The supporting and mounting means for the base element 1 includes a pair of U-shaped clamping elements 10, the horizontal portions of these clamping elements being disposed in operative positions seated in the grooves 9. It will, of course, be understood that two of such clamping members 10 are used and when operatively mounted they are disposed in inverted position so that the legs thereof extend downwardly on each side of the usual vehicle leaf-type springs 11. The clamping members 10 extend downwardly below supports 12 of the vehicle axle and extend through plates 13 to which they are affixed in base block clamping position by means of nuts 14. It will thus be appreciated that the complete assembly so far described is mounted on the leaf springs 11 and is clamped thereto by means of the clamping members 10, blocks 12 and plate member 13. It will also be evident that the casing 6 which surrounds all but one side of the coil spring and rod assembly is moveably assembled in the apparatus relative to the base block 1 and the rods 3, and the dimensions thereof are such that the base block may be received therein.

The vehicle chassis includes the usual stringer members 15 to which a metallic plate-like element 16 is affixed. This metallic plate-like element 16 is disposed on the stringer in position behind the shock absorber assembly which I have described hereinabove and the plate 16 is of substantially triangular configuration with the apex thereof extending upwardly. A substantially horizontally disposed projection 17 which is preferably though not necessarily formed integral with the plate 16 extends outwardly therefrom in normal position disposed above the casing 6 and disposed between the rods 3 and the nuts 8.

Figure 4:
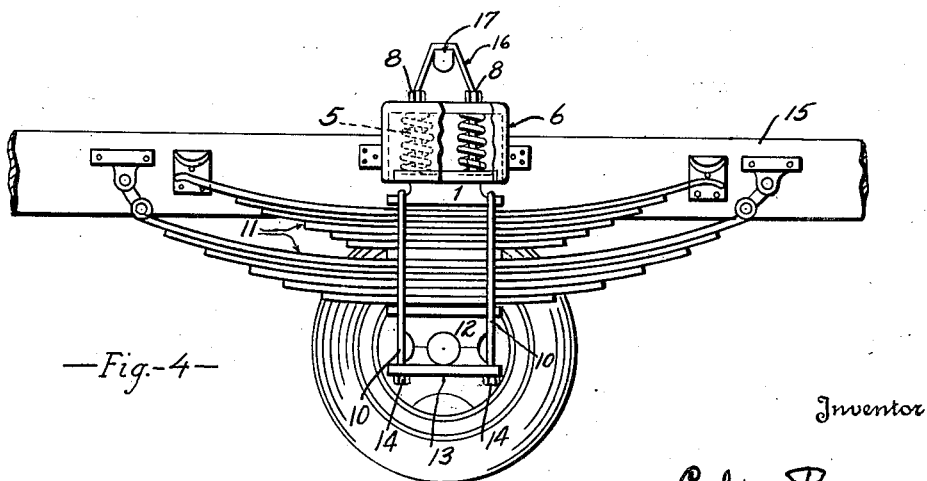
Fig. 4 is a view in side elevation of the auxiliary shock absorber installed on a vehicle, parts of the shock absorber and the vehicle being broken away.

The operation and functioning of this device serves as an auxiliary to the main sustaining springs 11 and, as illustrated particularly in Figs. 1, 3 and 4 of the drawings, when the vehicle is not heavily loaded the auxiliary shock absorber of this invention is inoperative due to the fact that the chassis, including the stringer 15 to which the plate-like element 16 and projection 17 are affixed, is not weighted down to flex the springs 11. Thus, in a lightly loaded vehicle there is no danger of breakage to the main sustaining springs 11. When the vehicle is loaded, or when road conditions produce shock, the sustaining springs 11 are flexed towards the horizontal position as particularly illustrated in Fig. 5 of the drawings. Obviously overloading of the vehicle or severe shock is apt to break the springs and it is when the vehicle is loaded so as to downwardly flex the springs 11 towards the horizontal that my auxiliary shock absorber automatically comes into operation. It is of importance to note that the base block 1 is mounted intermediate the ends of the sustaining springs where no flexing takes place. Thus under heavy load or road shock conditions the flexing of the sustaining springs produces no substantial movement in the base block, coil springs and casing, while of course the stringer 15 will move in accordance with the flexing of the springs, and such movement will obviously produce a corresponding downward movement to plate 16 and projection 17. With the springs flexed as illustrated particularly in Fig. 5 of the drawings, the chassis including the stringer 15 moves downwardly, and along with the downward movement of the stringer 15 moves the plate 16 and its projection 17. The projection in its downward movement engages the top 21 of the casing 6 and against the tension of the coil springs 5 pushes the casing downwardly relative to the rods 3 and the block 1 and thereby relieves and eliminates the shock upon the sustaining springs 11. The contraction of the coil springs 5 under the influence of the downward movement of the casing 6 resulting from the engagement of projection 17 thereupon obviously relieves the load on the sustaining springs 11 and prevents any normally damaging shocks from occurring. Clearly, when the shocks or loads are removed from the vehicle, the chassis including the stringer 15 will move upwardly and the upward movement of the projection 17 will permit the casing 6 to move upwardly and remove the tension on the coil springs 5.

I have produced these desirable and advantageous shock absorbing features by mounting the resilient shock absorbing assembly, that is, the base block, coil springs and casing, on a portion of the sustaining springs which are not effected by flexing of the sustaining springs, and I have mounted the shock absorber actuating device, that is the projection 17, on the chassis which is effected by the flexing of the springs. Thus the resilient assembly is what I shall term a stationary assembly while the actuating device is movably mounted.

Figure 8:
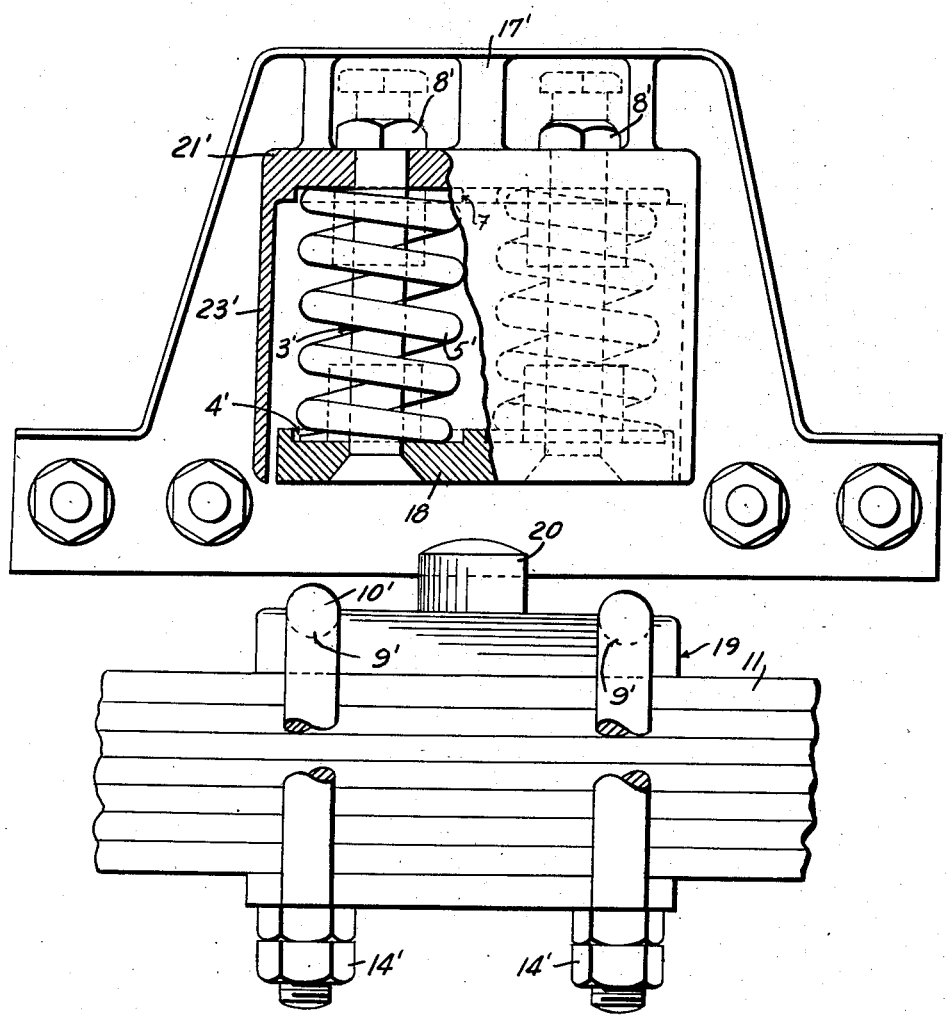
Fig. 8 is a view in front elevation with parts thereof in section of the shock absorber illustrated in Fig. 7.

In Figs. 7 through 9 of the drawings I have illustrated a modified form of my invention. In this form of my auxiliary shock absorber I provide a casing designated generally by the numeral 6', the casing includes a top 21', front 22' and ends 23', and is attached to the metallic plate 16' in any suitable manner. The plate 16' is fixed to the chassis of the vehicle and moves therewith and includes the horizontal projection 17' which is in constant engagement with top 21' of the casing. In this form of my invention more than one projection may be used if additional reinforcement for top 21' is desired. The under surface of top 21' is provided with two spaced annular grooves or recesses 7'. An operating plate 18 is provided for movement by an actuating device to be hereinafter described. The plate 18 is provided with annular grooves or recesses 4', complimentary to recesses 7', and apertures are provided centrally of the recesses. A pair of rods or bolts 3' slidably extend through apertures in top 21' into the apertures within operating plate 18 in which they are threaded or otherwise fixed. Nuts 8' are threaded on the bolts exteriorly of the casing and coil springs 5' are disposed about rods 3', the ends of the springs being seated in recesses 4' and 7'. It will thus be apparent that I have provided a resilient shock absorbing assembly mounted on the chassis of a vehicle for movement therewith, and that this assembly includes an operating plate movable relative to the remainder of the assembly.

The actuating assembly includes a substantially rectangular block 19 having transverse grooves 9' extending across the top thereof. A projecting or movable plate contacting knob or abutment 20 projects upwardly from the block 9. Block 19 is mounted on and secured to the vehicle sustaining springs 11 by means of inverted U clamp 10', the horizontal portions of which rest in grooves 9' and the legs of which extend downwardly on each side of the sustaining springs. Nuts 14' secure the clamps to the sustaining springs, by means of plates similar to plates 13 illustrated in the preferred form of my invention.

The actuating device or assembly is mounted on the sustaining springs above the vehicle axle and is not substantially effected by flexing of the springs under load and road conditions. The positioning of the actuating device is such that the abutment 20 is directly below and in line with the solid area of operating plate 18 between the apertures therein.

In Fig. 8 of the drawings I have illustrated the relative positions of the resilient shock absorbing assembly and actuating device therefor under light load, and smooth road conditions, while in Fig. 9 of the drawings I have illustrated the shock absorbing assembly and actuating device under heavy load condition and/or shock producing road conditions.

Referring particularly to Fig. 9 of the drawings, the action of the auxiliary shock absorbing device is illustrated under heavy load conditions or road shock conditions. It will be evident that the block element 19 which is mounted centrally of the sustaining springs 11 will not substantially move and will be uneffected when the sustaining springs are caused to flex under a heavy load and/or undue shocks, however under these load and shock conditions just outlined the chassis of the vehicle will move downwardly with the flexing of the springs thereby moving the resilient shock absorber assembly downwardly until the operating plate 18 thereof engages the projection 20 of the actuating device, and since the projection 20 is substantially stationary the operating plate 18 will be forced upwardly within the casing 6' contracting the coil springs 5' and thereby relieving and eliminating possible damaging shocks upon the sustaining springs 11. When the operating plate 18 is forced upwardly against the tension of coil springs the bolts 3' are slid upwardly through the apertures provided in the top 21' of the casing 6'. It will thus be appreciated that the coil springs 5' will take undue load and shock from the sustaining springs 11.

I claim:

An auxiliary shock absorber for vehicles provided with chassis mounted on main sustaining springs, comprising a shock absorber assembly including a block clamped to the sustaining spring intermediate the ends thereof, rods mounted on said block and projecting upwardly therefrom, coil springs mounted on said block and disposed about said rods, a casing having holes in the top thereof slidably receiving the rods and said casing resting on the coil springs, and an actuating assembly mounted on said chassis for operating said shock absorbing assembly under heavy load and road shock conditions to relieve the main sustaining springs from damaging flexing under such load and shock conditions, said actuating assembly mounted on the chassis to move therewith as the sustaining springs flex while the shock absorbing assembly is substantially uneffected by the flexing of the sustaining springs, said actuating assembly including a rigid projection extending over said casing when the sustaining springs are in substantially normal position and movable with the chassis into position engaging and moving said casing against the tension of the coil springs when the sustaining springs are flexed.

AVELINO PEREZ.

REFERENCES CITED

The following references are of record in the file of this patent:

UNITED STATES PATENTS

| Number | Name | Date |
| --- | --- | --- |
| 962,703 | Eckhard | June 28, 1910 |
| 2,229,808 | Jennings | Jan. 28, 1941 |
| 2,411,852 | Domine | Dec. 3, 1946 |